(12) United States Patent
Aggarwal et al.

(10) Patent No.: US 7,590,115 B1
(45) Date of Patent: *Sep. 15, 2009

(54) EXCHANGE OF CONTROL INFORMATION FOR VIRTUAL PRIVATE LOCAL AREA NETWORK (LAN) SERVICE MULTICAST

(75) Inventors: Rahul Aggarwal, San Francisco, CA (US); Yakov Rekhter, New Rochelle, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 596 days.

This patent is subject to a terminal disclaimer.

(21) Appl. No.: 11/213,639

(22) Filed: Aug. 26, 2005

Related U.S. Application Data

(60) Provisional application No. 60/605,629, filed on Aug. 30, 2004.

(51) Int. Cl.
H04L 12/28 (2006.01)
H04L 12/56 (2006.01)
H04J 3/26 (2006.01)
G06F 15/16 (2006.01)

(52) U.S. Cl. .................... 370/390; 370/395.5; 370/432; 709/230

(58) Field of Classification Search ................. 370/390, 370/400, 401, 331, 432, 395.5; 709/227, 709/225, 228, 230
See application file for complete search history.

(56) References Cited

U.S. PATENT DOCUMENTS

| | | | |
|---|---|---|---|
| 5,600,642 A | 2/1997 | Pauwels et al. | |
| 6,374,303 B1 | 4/2002 | Armitage et al. | |
| 6,477,166 B1 | 11/2002 | Sanzi et al. | |
| 6,493,349 B1 | 12/2002 | Casey | |
| 6,501,754 B1 | 12/2002 | Ohba et al. | |
| 6,553,028 B1 | 4/2003 | Tang et al. | |
| 6,731,652 B2 | 5/2004 | Ramfelt et al. | |
| 6,751,218 B1 | 6/2004 | Hagirahim et al. | |
| 6,778,531 B1 * | 8/2004 | Kodialam et al. | 370/390 |
| 6,807,182 B1 * | 10/2004 | Dolphin et al. | 370/401 |

(Continued)

FOREIGN PATENT DOCUMENTS

JP    2005130258 A  *  5/2005

(Continued)

OTHER PUBLICATIONS draft-ietf-idmr-pim-arch-05 by Steven Dearing "Protocol Independent Multicast-Sparse mode" Pub: Aug. 4, 1998.*

(Continued)

*Primary Examiner*—Ayaz R Sheikh
*Assistant Examiner*—Hoang-Chuong Q Vu
(74) *Attorney, Agent, or Firm*—Shumaker & Sieffert, P.A

(57) ABSTRACT

Principles of the invention are described for providing virtual private local area network service (VPLS) multicast instances across a public network by utilizing multicast trees. In particular, the VPLS multicast instances transport layer two (L2) multicast traffic, such as Ethernet packets, between customer networks via the public network. The principles described herein enable VPLS multicast instances to handle high bandwidth multicast traffic. The principles also reduce the state and the overhead of maintaining the state in the network by removing the need to perform snooping between routers within the network.

20 Claims, 9 Drawing Sheets

U.S. PATENT DOCUMENTS

| | | | |
|---|---|---|---|
| 6,847,638 B1 * | 1/2005 | Wu et al. ................... | 370/389 |
| 6,879,594 B1 | 4/2005 | Lee et al. | |
| 6,920,503 B1 | 7/2005 | Nanji et al. | |
| 6,968,389 B1 | 11/2005 | Menditto et al. | |
| 7,035,226 B2 | 4/2006 | Enoki et al. | |
| 7,039,687 B1 | 5/2006 | Jamieson et al. | |
| 7,082,102 B1 | 7/2006 | Wright | |
| 7,133,928 B2 * | 11/2006 | McCanne ................... | 709/238 |
| 7,251,218 B2 | 7/2007 | Jorgensen | |
| 7,260,097 B2 * | 8/2007 | Casey .......................... | 370/392 |
| 7,269,135 B2 | 9/2007 | Frick et al. | |
| 7,281,058 B1 * | 10/2007 | Shepherd et al. ............ | 709/238 |
| 7,330,468 B1 | 2/2008 | Tse-Au | |
| 7,333,491 B2 * | 2/2008 | Chen et al. .................. | 370/392 |
| 7,359,328 B1 | 4/2008 | Allan | |
| 7,360,084 B1 * | 4/2008 | Hardjono ................... | 713/163 |
| 7,366,894 B1 | 4/2008 | Kalimuthu et al. | |
| 7,418,003 B1 * | 8/2008 | Alvarez et al. ............. | 370/432 |
| 7,463,591 B1 | 12/2008 | Kompella et al. | |
| 7,483,439 B2 * | 1/2009 | Shepherd et al. ........... | 370/401 |
| 2002/0071390 A1 | 6/2002 | Reeves et al. | |
| 2002/0118644 A1 | 8/2002 | Moir | |
| 2002/0181477 A1 * | 12/2002 | Mo et al. .................... | 370/401 |
| 2002/0186664 A1 | 12/2002 | Gibson et al. | |
| 2002/0191584 A1 | 12/2002 | Korus et al. | |
| 2003/0012215 A1 | 1/2003 | Novaes | |
| 2003/0021282 A1 | 1/2003 | Hospodor | |
| 2003/0031175 A1 | 2/2003 | Hayashi et al. | |
| 2003/0043772 A1 | 3/2003 | Mathis et al. | |
| 2003/0063591 A1 | 4/2003 | Leung et al. | |
| 2003/0087653 A1 | 5/2003 | Leung et al. | |
| 2003/0088696 A1 * | 5/2003 | McCanne ................... | 709/238 |
| 2003/0099235 A1 | 5/2003 | Shin et al. | |
| 2003/0112748 A1 | 6/2003 | Puppa et al. | |
| 2003/0123446 A1 | 7/2003 | Muirhead et al. | |
| 2003/0172114 A1 | 9/2003 | Leung | |
| 2003/0177221 A1 | 9/2003 | Ould-Brahim et al. | |
| 2003/0191937 A1 | 10/2003 | Balissat et al. | |
| 2004/0037279 A1 * | 2/2004 | Zelig et al. .................. | 370/390 |
| 2004/0047342 A1 | 3/2004 | Gavish et al. | |
| 2004/0081154 A1 | 4/2004 | Kouvelas | |
| 2004/0151180 A1 | 8/2004 | Hu et al. | |
| 2004/0151181 A1 | 8/2004 | Chu et al. | |
| 2004/0177157 A1 * | 9/2004 | Mistry et al. ................ | 709/241 |
| 2004/0190517 A1 | 9/2004 | Gupta et al. | |
| 2004/0218536 A1 * | 11/2004 | Yasukawa et al. ........... | 370/238 |
| 2005/0018693 A1 | 1/2005 | Dull | |
| 2005/0027782 A1 * | 2/2005 | Jalan et al. .................. | 709/200 |
| 2005/0089047 A1 * | 4/2005 | Ould-Brahim et al. . | 370/395.53 |
| 2005/0097203 A1 | 5/2005 | Unbehagen et al. | |
| 2005/0108419 A1 | 5/2005 | Eubanks | |
| 2005/0111351 A1 | 5/2005 | Shen | |
| 2005/0169270 A1 * | 8/2005 | Mutou et al. ................ | 370/390 |
| 2005/0220132 A1 * | 10/2005 | Oman et al. ................ | 370/432 |
| 2005/0232193 A1 | 10/2005 | Jorgensen | |
| 2005/0262232 A1 * | 11/2005 | Cuervo et al. ............... | 709/223 |
| 2005/0265308 A1 * | 12/2005 | Barbir et al. ................ | 370/351 |
| 2005/0271035 A1 * | 12/2005 | Cohen et al. ................ | 370/351 |
| 2005/0271036 A1 | 12/2005 | Cohen et al. | |
| 2005/0281192 A1 | 12/2005 | Nadeau et al. | |
| 2006/0013141 A1 | 1/2006 | Mutoh et al. | |
| 2006/0039364 A1 | 2/2006 | Wright | |
| 2006/0047851 A1 * | 3/2006 | Voit et al. ................... | 709/239 |
| 2006/0088031 A1 | 4/2006 | Nalawade | |
| 2006/0147204 A1 * | 7/2006 | Yasukawa et al. ............ | 398/26 |
| 2006/0153067 A1 | 7/2006 | Vasseur et al. | |
| 2006/0182034 A1 | 8/2006 | Klinker et al. | |
| 2006/0221958 A1 | 10/2006 | Wijnands et al. | |
| 2007/0036162 A1 | 2/2007 | Tingle et al. | |
| 2007/0098003 A1 | 5/2007 | Boers et al. | |
| 2007/0124454 A1 * | 5/2007 | Watkinson .................. | 709/223 |
| 2007/0140107 A1 | 6/2007 | Eckert et al. | |
| 2008/0056258 A1 * | 3/2008 | Sharma et al. .............. | 370/390 |
| 2008/0123654 A1 | 5/2008 | Tse-Au | |
| 2008/0291921 A1 | 11/2008 | Du et al. | |
| 2009/0028149 A1 * | 1/2009 | Yasukawa et al. ........... | 370/390 |

FOREIGN PATENT DOCUMENTS

| | | | |
|---|---|---|---|
| JP | 2005167482 A | * | 6/2005 |
| JP | 2005252385 A | * | 9/2005 |
| KR | 2004001206 | | 1/2004 |
| WO | WO 02/091670 A2 | | 11/2002 |
| WO | WO 2004/071032 A1 | | 8/2004 |

OTHER PUBLICATIONS

RFC 1771 A Border Gateway Protocol BGP4, by Y.Rekhter Pub: Mar. 1995.*

Deering et al., Protocol Independent Multicast-Sparse Mode (PIM-SM): Motivation and Architecture, Aug. 4, 1998, Network Working Group Internet Draft.*

Rosen et al., "Multicast in MPLS/BGP IP VPNs", May 2004, Network Working Group Internet Draft.*

Rekhter et al., A Border Gateway Protocol 4 (BGP-4), Mar. 1995, RFC 1771.*

Aggarwal et al., "Establishing Point to Multipoint MPLS TE LSPs," submitted to Internet Engineering Task Force (IETF) Feb. 11, 2007 pp. 1-15.

Yasukawa et al. "Requirements for Point to Multipoint extension to RSVP-TE," IETF, Oct. 2003, pp. 1-20.

Atlas et al., "MPLS RSVP-TE Interoperability for Local Protection/ Fast Reroute," IETF, Jul. 2001, pp. 1-14.

D. Awduche et al., "RFC 3209—RSVP-TE: Extensions to RSVP for LSP Tunnels," Network Working Group, Dec. 2001, 64 pgs. http://rfc.sunsite.dk/rfc/rfc3209html.

RSVP-TE: Resource Reservation Protocol—Traffic Extension, Javvin Company, 2 pgs, printed Apr. 18, 2005. http://www.javvin.com/protocolRSVPTE.html.

U.S. Appl. No. 11/056,383, entitled "Fast Reroute Of Traffic Associated With A Point To Multi-Point Network Tunnel," filed Feb. 10, 2005.

U.S. Appl. No. 11/215,813, entitled "Point To Multi-Point Label Switched Paths With Label Distribution Protocol," filed Aug. 29, 2005.

U.S. Appl. No. 11/192,432, entitled Transmission Of Layer Two (L2) Multicast Traffic Over Multi-Protocol Label Switching Networks, filed Jul. 28, 2005.

U.S. Appl. No. 11/212,509, entitled "Aggregate Multicast Trees For Multicast Virtual Private Networks," filed Aug. 26, 2005.

U.S. Appl. No. 11/212,500, entitled "Multicast Data Trees For Multicast Virtual Private Networks," filed Aug. 26, 2005.

U.S. Appl. No. 11/212,507, entitled "Reliable Exchange Of Control Information For Multicast Virtual Private Networks," filed Aug. 26, 2005.

U.S. Appl. No. 11/213,636, entitled "Transport Of Control And Data Traffic For Multicast Virtual Private Networks," filed Aug. 26, 2005.

U.S. Appl. No. 11/213,638, entitled "Shared Multicast Trees For Multicast Virtual Private Networks," filed Aug. 26, 2005.

U.S. Appl. No. 11/212,475, entitled "Label Switching Multicast Trees For Multicast Virtual Private Networks," filed Aug. 26, 2005.

U.S. Appl. No. 11/212,932, entitled "Multicast Trees For Virtual Private Local Area Network (LAN) Service Multicast," filed Aug. 26, 2005.

U.S. Appl. No. 11/213,637, entitled "Aggregate Multicast Trees For Virtual Private Local Area Network (LAN) Service Multicast," filed Aug. 26, 2005.

U.S. Appl. No. 11/212,490, entitled "Multicast Data Trees For Virtual Private Local Area Network (LAN) Service Multicast," filed Aug. 26, 2005.

U.S. Appl. No. 11/213,640, entitled "Auto-Discovery Of Multicast Virtual Private Networks," filed Aug. 26, 2005.

U.S. Appl. No. 11/213,641, entitled "Inter-Autonomous System (AS) Multicast Virtual Private Networks," filed Aug. 26, 2005.

B. Zhang and H. Mouftah, "A Destination-initiated Multicast Routing Protocol for Shortest Path Tree Constructions," GLOBECOM 2003, IEEE Global Telecommunications Conference, XP010677629, pp. 2840-2844.

Eric C. Rosen et al., "Multicast in MPLS/BGP IP VPNs," draft-rosen-vpn-mcast-07.txt, May 2004, 27 pgs.

K. Kompella et al., "Virtual Private LAN Service," draft-ietf-l2vpn-vpls-bgp-00.txt, May 2003, 22 pgs.

L. Martini et al., "Transport of Layer 2 Frames Over MPLS," Network Working Group Internet Draft, draft-martini-l2circuit-trans-mpls-08.txt, Nov. 2001, 18 pgs.

L. Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pgs.

Aggarwal et al., "MPLS Upstream Label Assignment and Context Specific Label Space," Network Working Group Internet Draft, draft-raggarwa-mpls-upstream-label-00.txt, Jan. 2005, 9 pgs.

Wijnands et al., "Multicast Extensions for LDP," Network Working Group Internet Draft, draft-wijnands-mpls-ldp-mcast-ext-00.txt, Mar. 2005, 13 pgs.

* cited by examiner

EXCHANGE OF CONTROL INFORMATION FOR VIRTUAL PRIVATE LOCAL AREA NETWORK (LAN) SERVICE MULTICAST

This application claims the benefit of U.S. Provisional Application No. 60/605,629, filed Aug. 30, 2004, the entire content of which is incorporated herein by reference.

CROSS-REFERENCE TO RELATED APPLICATIONS

This application is related to the following applications:

"Aggregate Multicast Trees for Multicast Virtual Private Networks," by Rahul Aggarwal and Yakov Rekhter, U.S. patent application Ser. No. 11/212,509, filed the same day as the present application;

"Multicast Data Trees For Multicast Virtual Private Networks," by Rahul Aggarwal, Yakov Rekhter and Anil Lohiya, U.S. patent application Ser. No. 11/212,500, filed the same day as the present application;

"Reliable Exchange Of Control Information For Multicast Virtual Private Networks," by Rahul Aggarwal, Yakov Rekhter and Anil Lohiya, U.S. patent application Ser. No. 11/212,507, filed the same day as the present application;

"Transport of Control And Data Traffic For Multicast Virtual Private Networks," by Rahul Aggarwal, Yakov Rekhter and Anil Lohiya U.S. patent application Ser. No. 11/213,636, filed the same day as the present application;

"Shared Multicast Trees For Multicast Virtual Private Networks," by Rahul Aggarwal and Yakov Rekhter, U.S. patent application Ser. No. 11/213,638, filed the same day as the present application;

"Label Switching Multicast Trees For Multicast Virtual Private Networks," by Rahul Aggarwal, Yakov Rekhter and Anil Lohiya, U.S. patent application Ser. No. 11/212,475, filed the same day as the present application;

"Multicast Trees for Virtual Private Local Area Network (LAN) Service Multicast," by Rahul Aggarwal and Yakov Rekhter, U.S. patent application Ser. No. 11/212,932, filed the same day as the present application;

"Aggregate Multicast Trees For Virtual Private local Area Network (LAN) Service Multicast," by Rahul Aggarwal and Yakov Rekhter, U.S. patent application Ser. No. 11/213,637, filed the same day as the present application;

"Multicast Data Trees For Virtual Private local Area Network (LAN) Service Multicast," by Rahul Aggarwal and Yakov Rekhter, U.S. patent application Ser. No. 11/212,490, filed the same day as the present application;

"Auto-Discovery Of Multicast Virtual Private Networks," by Rahul Aggarwal and Yakov Rekhter, U.S. patent application Ser. No. 11/213,640, filed the same day as the present application; and "Inter-Autonomous System (AS) Multicast Virtual Private Networks," by Rahul Aggarwal and Yakov Rekhter, U.S. patent application Ser. No. 11/213,641, filed the same day as the present application, the entire content of each of which is incorporated herein by reference

TECHNICAL FIELD

The invention relates to computer networks and, more particularly, to virtual private local area network service (VPLS) instances established over computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

Virtual private local area network service (VPLS) instances are often used to extend two or more remote customer networks, i.e., VPLS sites, through a public network, such as the Internet, as if the public network does not exist. VPLS instances often transport layer two (L2) communications, such as Ethernet packets, between customer networks via the public network. In a typical configuration, routers coupled to the customer networks define label switched paths (LSPs) within the public network to carry encapsulated L2 communications as if these customer networks were directly attached to the same LAN.

In some cases, a VPLS multicast instance may be configured to carry L2 multicast traffic, such as Internet Protocol Television (IPTV), desktop conferences, corporate broadcasts, music and video web casts, and other forms of multimedia content. VPLS multicast instances typically rely on ingress replication to transmit the multicast traffic from a multicast source to subscriber devices within the customer networks. Ingress replication causes an ingress router of a VPLS to replicate a multicast data packet of a particular multicast group and send it to each egress router of the VPLS on the path to a subscriber device of that multicast group. However, ingress replication may be a reasonable model only when the bandwidth of the multicast traffic is low and/or the number of replications performed by the ingress router for a particular multicast data packet is small.

In order to send multicast packets only to the egress routers of the VPLS that have subscriber devices for that traffic, the ingress router of the VPLS may use internet group management protocol (IGMP) snooping or protocol independent multicast (PIM) snooping between the routers and the customer networks. However, each router in the network then has to maintain state for all of the multicast source and group (S,G) entries in each of the VPLS multicast instances to which the router belongs. In addition, the PIM snooping is also performed on pseudo-wire (PW) interfaces between the routers within the network. This introduces a non-negligible overhead on the routers.

SUMMARY

In general, principles of the invention relate to providing virtual private local area network service (VPLS) multicast instances across a public network by utilizing multicast trees. For example, the VPLS multicast instances may transport layer two (L2) multicast traffic, such as Ethernet packets, between remote customer networks via the public network. The principles described herein enable VPLS multicast instances to handle high-bandwidth multicast traffic. The principles may also reduce the state and the overhead of maintaining the state in the network by removing the need to perform snooping between routers within the network.

For example, a router within a public network, such as the Internet, learns customer source-group (<C-S, C-G>) entries of other routers in the public network without performing snooping on a backbone of the public network. A router may use IGMP/PIM (internet group management protocol/protocol independent multicast) snooping to learn the <C-S, C-G> entries of the local router. In addition, a router may use reliable transport, such as BGP or PIM with reliability extensions, to transmit control messages, such as customer join/prune messages, between remote routers within the public network.

Multicast trees may be setup across the public network using protocol independent multicast (PIM) or non-PIM protocols, such as multi-protocol label switching (MPLS) protocols. The MPLS protocol may include the label distribution protocol (LDP) and the resource reservation protocol (RSVP), which may be extended to include traffic engineering (TE) capabilities. The multicast trees may comprise aggregate multicast trees that support more than one VPLS multicast instance. In addition, data multicast trees may be setup to transmit traffic for specific high-bandwidth multicast groups. The multicast trees may be source trees or shared trees.

In one embodiment, a method comprises establishing a multicast tree having a source device and one or more destination devices within a network, wherein each of the one or more destination devices belongs to at least one VPLS multicast instance. The method further comprises exchanging control information for the VPLS multicast instances between the source device and the one or more destination devices with a reliable transport protocol that substantially eliminates snooping of the control information.

In another embodiment, a network device comprises a control unit that establishes a multicast tree having a source device and one or more destination devices within a network, wherein each of the destination devices belongs to at least one VPLS multicast instance. The network device also comprises a device-device exchange module within the control unit that exchanges control information for the VPLS multicast instances between the source device and the one or more destination devices with a reliable transport protocol that substantially eliminates snooping of the control information.

In another embodiment, a computer-readable medium comprises instructions that cause a programmable processor to establish a multicast tree having a source device and one or more destination devices within a network, wherein each of the destination devices belongs to at least one VPLS multicast instance. The instructions further cause the programmable process to exchange control information for the VPLS multicast instances between the source device and the one or more destination devices with a reliable transport protocol that substantially eliminates snooping of the control information.

In a further embodiment, a system comprises a source device within a network, one or more destination devices within the network, wherein each of the destination devices belongs to at least one VPLS multicast instance, a multicast tree established within the network from the source device to the one or more destination devices, and tunnels established between the source device and the one or more destination devices that transmit control information for the VPLS multicast instances with a reliable transport protocol that substantially eliminates snooping of the control information.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
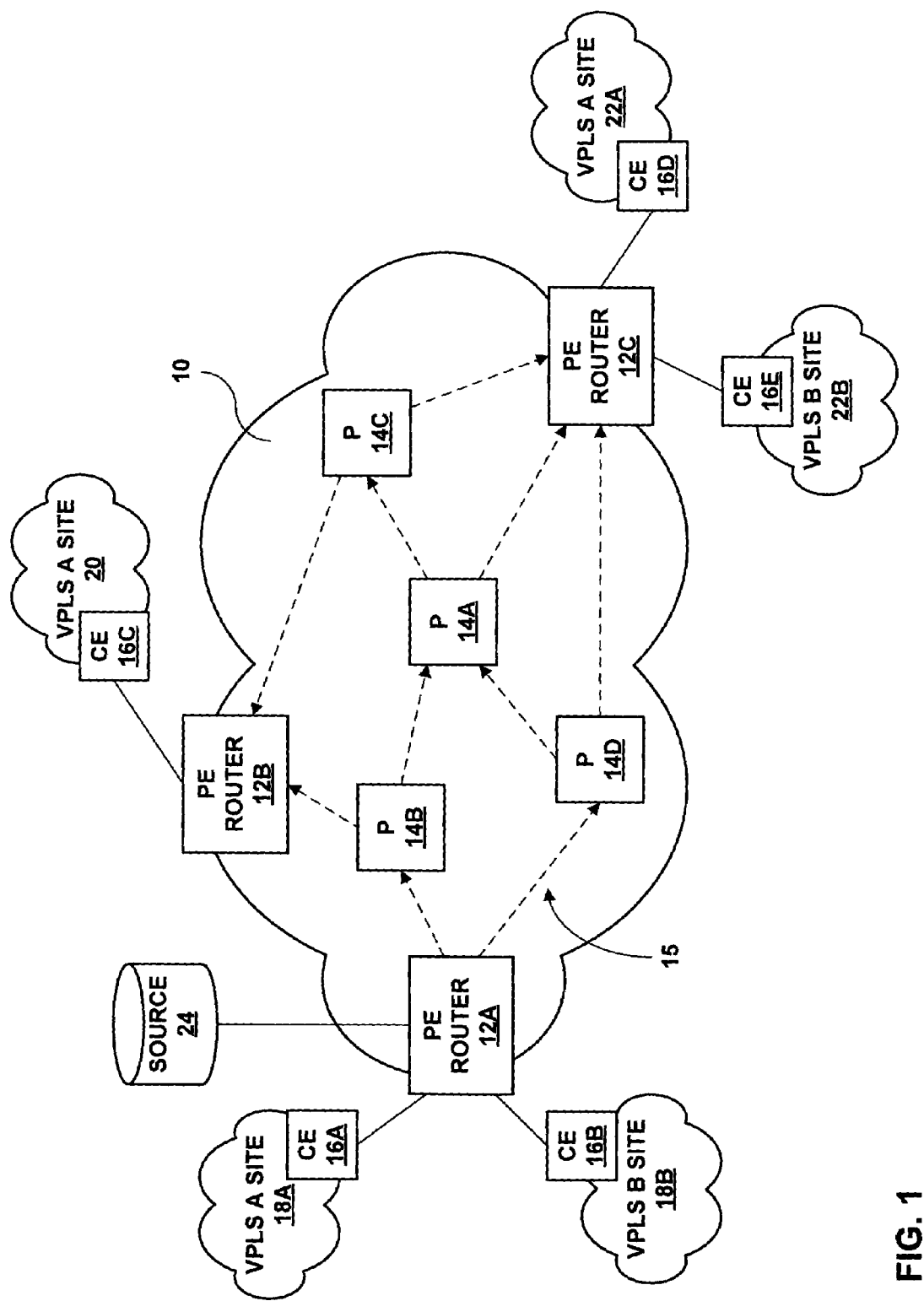
FIG. 1 is a block diagram illustrating an example service provider (SP) network in which provider edge (PE) routers support at least one virtual private local area network service (VPLS) multicast instance.

FIG. 1 is a block diagram illustrating an example service provider (SP) network 10 in which provider edge (PE) routers 12A-12C ("PE routers 12") support at least one virtual private local area network service (VPLS) multicast instance. In the illustrated embodiment, PE router 12A sets up a multicast tree 15 across the SP network 10 to provide layer two (L2) multicast service between PE routers 12. For example, multicast tree 15 may transport L2 multicast traffic from a multicast source 24 to subscriber devices within at least one of the VPLS A site and the VPLS B site coupled to PE routers 12. In other embodiments, multicast tree 15 may be setup by any one of PE routers 12.

SP network 10 may comprise the Internet or another public network. In some cases, SP network 10 may comprise a multi-protocol label switching (MPLS) network. Each of the VPLS sites may include a local area network (LAN) or a wide area network (WAN) that comprises a plurality of subscriber devices, such as desktop computers, laptops, workstations, PDAs, wireless devices, network-ready appliances, file servers, print servers or other devices.

Each of PE routers 12 couples to one or more of the VPLS sites via customer edge (CE) routers 16A-16E ("CE routers 16"). For example, PE router 12A is coupled to VPLS A site 18A and VPLS B site 18B via CE router 16A and CE router 16B, respectively. PE router 12A is also coupled to multicast source 24. PE router 12B is coupled to VPLS A site 20 via CE router 16C. PE router 13C is coupled to VPLS A site 22A and VPLS B site 22B via CE router 16D and CE router 16E, respectively. Multicast tree 15 couples PE routers 12 to each other via provider (P) routers 14A-14D ("P routers 14") within SP network 10.

In the illustrated embodiment, VPLS A and VPLS B established across SP network 10 are capable of carrying high-bandwidth multicast traffic with multicast trees. For example, VPLS A and VPLS B may carry L2 multicast traffic, such as Internet Protocol Television (IPTV), desktop conferences, corporate broadcasts, music and video web casts, and other forms of multimedia content, from multicast source 24 to subscriber devices within the VPLS A sites and the VPLS B sites. Principles described herein may reduce the state and the overhead of maintaining the state in SP network 10 by removing the need to perform snooping between PE routers 12 within SP network 10.

In this example, each of PE routers 12 includes a virtual switch interface (VSI) (not shown) for each VPLS multicast interface to which it has membership. PE routers 12 advertise their VPLS membership, i.e., the VSIs configured for multicast, to the other PE routers 12 using the border gateway protocol (BGP) or another VPLS auto-discovery mechanism. In this way, each of PE routers 12 in SP network 10 have a complete view of the VPLS memberships of the other PE routers.

Each of PE routers 12 may also discover customer source-group (<C-S, C-G>) entries for the other PE routers 12 within SP network 10. Learning the <C-S, C-G> entries allows PE routers 12 to send multicast packet for specific <C-S, C-G> entries only to the other PE routers 12 that have subscriber devices of the specific multicast group. This substantially eliminates flooding of PE router 12 that do not have subscriber devices of the specific multicast traffic.

For example, PE router 12A may learn the <C-S, C-G> entries from the local VSIs included on PE router 12A by performing IGMP/PIM (internet group management protocol/protocol independent multicast) snooping. Snooping is used because there is no PIM adjacency between CE routers 16A, 16B and PE router 12A. IGMP/PIM snooping allows PE router 12A to build a database of customer join messages sent by subscriber devices within VPLS sites 18A and 18B.

In conventional VPLS multicast instances that use ingress replication, a PE router may use PIM snooping to learn <C-S, C-G> entries of remote VSIs included on other PE routers in the network. However PIM snooping is computationally expensive. Furthermore the periodic nature of PIM Join/Prune messages implies that snooping PIM messages places even a greater processing burden on a PE router.

As described herein, PE routers 12 may use a reliable transport protocol to transmit customer control messages between PE routers 12 within SP network 10. A reliable transport protocol, such as BGP or PIM extended to include a refresh reduction mechanism, substantially eliminates the need to perform PIM snooping between PE routers 12 within SP network 10. For example, PE router 12A converts snooped customer join/prune messages from local VPLS sites 18A and 18B to reliable protocol messages. PE router 12A uses BGP or PIM with reliability extensions to transmit the converted customer join/prune messages to the other PE routers 12 in SP network 10. Each of PE routers 12 maintains a database of <C-S, C-G> entries that are snooped from the local PE router and discovered from the remote PE routers for each VPLS multicast instance. In some cases, PE routers 12 may transmit customer control traffic only to PE router 12A, which is coupled to multicast source 24. However, PE routers 12B and 12C do not have routes through SP network 10 to reach multicast source 24. Therefore, the customer join/prune messages are sent to all of PE routers 12 that belong to the particular VPLS. The PE router may use either PIM or BGP to transmit the customer control traffic.

As described above, VPLS auto-discovery allows each of PE routers 12 to learn the VPLS memberships of the other PE routers 12 within SP network 10. In the case of PIM, one of PE router 12 sends the customer control messages to all of PE routers 12 that belong to the VPLS using unicast PIM messages. In order to send the customer control messages to a particular remote PE router, e.g., PE router 12A, the control messages are encapsulated in the pseudo-wire (PW) used to reach PE router 12A.

Although join message suppression is disabled and PIM refresh reduction mechanisms are used, the use of PIM for propagation of customer control information may include scalability limitations. BGP, on the other hand, includes route-reflector machinery that allows PE routers 12 to transmit customer control traffic with increased scalability.

PE router 12A may setup multicast tree 15 across SP network 10 to transport customer multicast data with one of a variety of tunneling technologies. For example, multicast tree 15 may be setup by PE router 12A using PIM or non-PIM protocols, such as MPLS protocols. The MPLS protocols include the label distribution protocol (LDP) and the resource reservation protocol (RSVP), which may be extended to include traffic engineering (TE) capabilities. In the case of PE router 12A using RSVP-TE, multicast tree 15 may comprise a point-to-multipoint (P2MP) label switched path (LSP).

In the illustrated embodiment, multicast tree 15 comprises an "aggregate" multicast tree capable of transmitting traffic for both VPLS A and VPLS B across SP network 10. In this way, SP network 10 does not need to separately maintain state per each VPLS as one multicast tree 15 can be use to support multiple VPLS multicast instances. In some cases, multicast tree 15 may comprise an aggregate "default" tree mapped to VPLS A and VPLS B. In other cases, since PE router 12A is coupled to multicast source 24, multicast tree 15 may comprise an aggregate "data" tree mapped to specific multicast groups. These embodiments are further described below.

In the case where multicast tree 15 comprises an aggregate default tree, multicast tree 15 carries traffic of all the multicast groups requested by subscriber devices within both VPLS A and VPLS B. PE router 12A may setup multicast tree 15 as an aggregate default tree by using BGP to discover egress PE routers 12B and 12C, i.e., the leaves of multicast tree 15. VPLS auto-discovery allows PE router 12A to learn the VPLS membership information of PE routers 12B and 12C. This in turn allows the creation of the aggregate default tree mapped to VPLS A and VPLS B. The leaves of the aggregate default tree are the PE routers within SP network 10 that belong to one or more of the VPLS multicast instances mapped to the aggregate default tree. In other embodiments, aggregate default tree 15 maybe set up by any of PE routers 12 or by a rendezvous point (RP), e.g., one of P routers 14, within SP network 10.

By removing the need to separately maintain per VPLS state in SP network 10, aggregate default trees may effectively reduce the number of trees in SP network 10 and the signaling overhead associated with maintaining these trees. However, since aggregate default tree 15 carries traffic for all the multicast groups requested in both VPLS A and VPLS B, aggregate default tree 15 may deliver a multicast data packet for a particular group to some of PE routers 12 that do not have subscriber devices for that multicast group.

In the case where multicast tree 15 comprises an aggregate data tree, multicast tree 15 only carries traffic of specific multicast groups from multicast source 24 to the VPLS sites that include subscriber devices of the multicast traffic. Multicast tree 15 may be setup as an aggregate data tree 15 by a router in SP network 10 that is coupled to multicast source 24, i.e., PE router 12A. PE router 12A may setup multicast tree 15 as an aggregate data tree by using a reliable transport protocol to discover egress PE routers 12B and 12C, i.e., the leaves of multicast tree 15. In this way, PE router 12A is able to create a separate multicast tree 15 as an aggregate data tree for specific, high-bandwidth multicast groups. More than one multicast group may be mapped onto the aggregate data tree. In addition, the multicast groups mapped to the aggregate data tree may also belong to different VPLS multicast instances.

As an aggregate data tree, multicast tree 15 transmits the traffic for these multicast groups only to those PE routers 12 with subscriber devices of the specific multicast groups. This avoids flooding other PE routers in the VPLS that have not requested the specific multicast traffic. When router 12A receives multicast traffic of one of the specific multicast groups mapped to multicast tree 15, PE router 12A may switch from an aggregate default tree to an aggregate data tree, e.g., multicast tree 15, to transmit the multicast traffic.

In addition, multicast tree 15 can be either a "source" tree or a "shared" tree. As used herein, a source tree is used to carry traffic only for the multicast VSIs that exist locally on the root of the tree. For example, in the case where PE router 12B is the root of multicast tree 15, as a source tree, multicast tree 15 may only carry traffic for VPLS A to which PE router 12B belongs. In contrast, a shared tree can carry traffic belonging to VSIs that exist on other PEs as well. For example, in the case where PE router 12B is the root of multicast tree 15, as a shared tree, multicast tree 15 may carry traffic for VPLS A to which PE router 12B belongs and for VPLS B to which PE router 12B does not belong.

Figure 2:
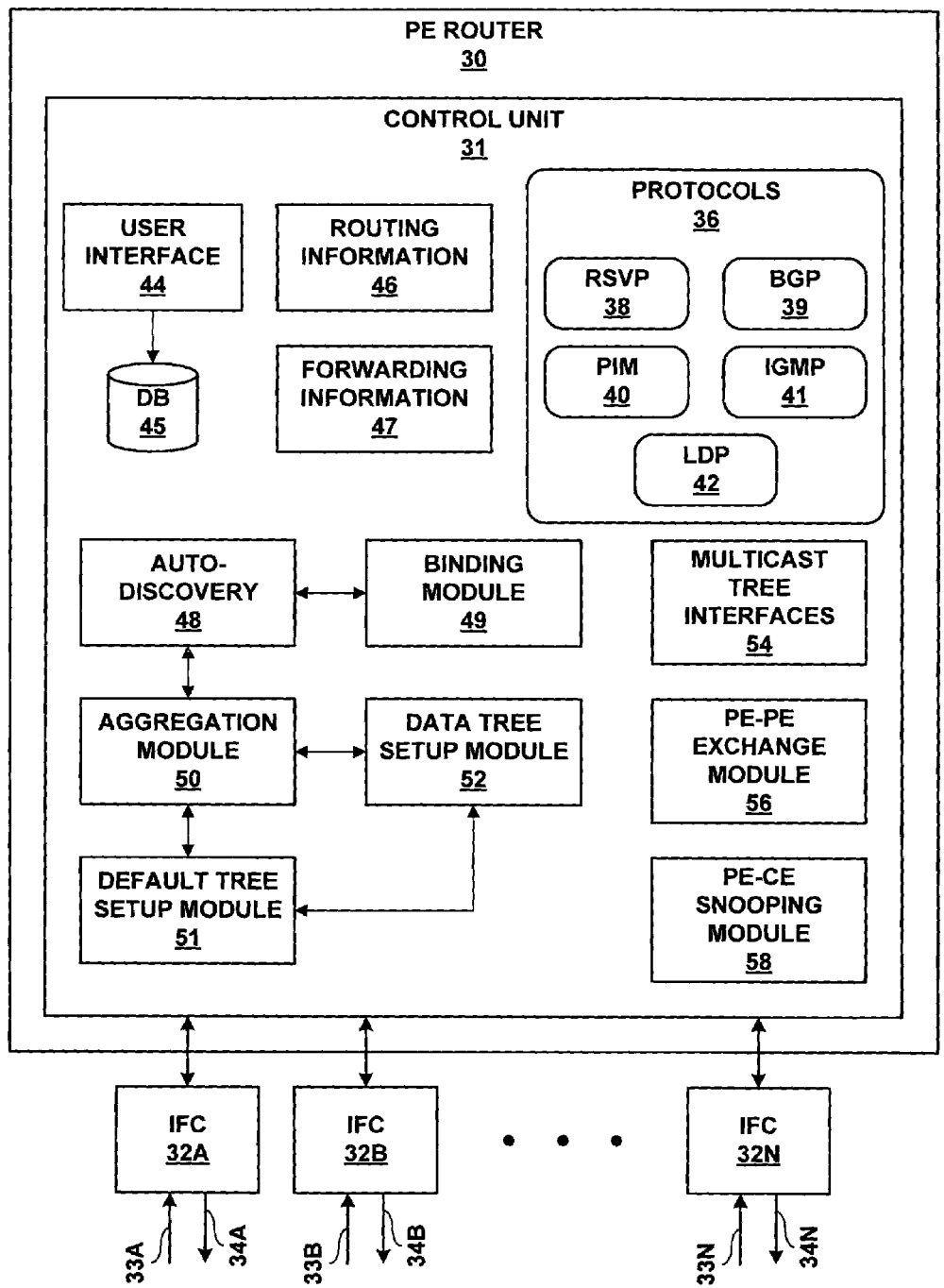
FIG. 2 is a block diagram illustrating an exemplary PE router capable of supporting one or more VPLS multicast interfaces.

FIG. 2 is a block diagram illustrating an exemplary PE router 30 capable of supporting one or more VPLS multicast interfaces in accordance with the techniques described herein. As one example, PE router 30 may comprise an ingress router or root of a multicast tree established across a public network, such as the Internet. PE router 30 may also comprise an egress router or leaf of a multicast tree established across the public network by another PE router. PE router 30 may operate substantially similar to any of PE routers 12 from FIG. 1.

In this example, PE router 30 includes interface cards 32A-32N ("IFCs 32") that receive multicast packets via inbound links 33A-33N ("inbound links 33") and send multicast packets via outbound links 34A-34N ("outbound links 34"). IFCs 32 are typically coupled to links 33, 34 via a number of interface ports. Router 30 also includes a control unit 31 that determines routes of received packets and forwards the packets accordingly via IFCs 32.

A system administrator may specify configuration information for PE router 30 via a user interface 44 included within control unit 31. The configuration information may then be stored in database (DB) 45 coupled to user interface 44. User interface 44 may include a display, a keyboard, a mouse or another type of input device.

Control unit 31 maintains routing information 46 that describes the topology of a network and, in particular, routes through the network. Routing information 46 may include, for example, route data that describes various routes within the network, and corresponding next hop data indicating appropriate neighboring devices within the network for each of the routes. Router 30 updates routing information 46 to accurately reflect the topology of the network.

Control unit 31 also maintains forwarding information 47 that associates network destinations with specific next hops and corresponding interface ports. In general, when router 30 receives a multicast packet via one of inbound links 33, control unit 31 determines a destination and associated next hop for the packet in accordance with routing information 46 and forwards the packet on one of outbound links 34 to the corresponding next hop in accordance with forwarding information 47 based on the destination of the packet.

Control unit 31 provides an operating environment for protocols 36 to execute. In the illustrated embodiment, protocols 36 include RSVP 38, BGP 39, PIM 40, IGMP 41, and LDP 42. Control unit 31 also includes auto-discovery module 48, binding module 49, aggregation module 50, default tree setup module 51, data tree setup module 52, multicast tree interfaces 54, PE-PE exchange module 56, and PE-CE snooping module 58. In other embodiments, binding module 49 and aggregation module 50 may comprise sub-modules within auto-discovery module 48. In still other embodiments, aggregation module 50 may comprise a sub-module in default tree setup module 51 and/or data tree setup module 52.

Auto-discovery module 48 advertises the VPLS multicast memberships of PE router 30 to other PE routers in the network using BGP 39 or another VPLS auto-discovery protocol. Auto-discovery module 58 also receives VPLS advertisements from the other PE routers. Therefore, PE router 30 may have a complete view of the VPLS multicast memberships of the other PE routers in the network. Auto-discovery module 48 then determines which PE routers in the network belong to the same VPLS multicast instances as PE router 30. In some cases, auto-discovery module 48 maintains PIM neighbor adjacencies with the PE routers of each of the VPLS multicast instances as long as the BGP advertisement is not withdrawn. In this way, PE router 30 does not have to perform PIM neighbor adjacency management.

PE-CE snooping module 58 snoops multicast control messages between PE router 30 and local CE routers of VPLS sites that include subscriber devices of multicast traffic. For example, PE-CE snooping module 58 may use PIM 40 or IGMP 41 to snoop customer join/prune messages for multicast groups from subscriber devices within the local VPLS sites. PE router 30 uses snooping to discover customer control information as there is no PIM neighbor adjacency between PE router 30 and the local CE routers.

PE-PE exchange module 56 utilizes a reliable transport protocol to transmit customer control messages between PE router 30 and remote PE routers in the network. PE-PE exchange module 56 may use either BGP 39 or PIM 40 extended to include a refresh reduction mechanism. In this way, PE-PE exchange module 56 substantially eliminates the need to periodically refresh customer control messages, such as customer join/prune messages. More specifically, PE-PE exchange module 56 converts the customer control messages snooped by PE-CE snooping module 58 to the reliable transport protocol. PE-PE exchange module 56 may then transmit the customer control messages to the other PE routers within the public network without performing snooping between the remote PE routers.

PE router 30 supports various multicast data packet tunneling technologies. Default tree setup module 51 and data tree setup module 52 do not place any restrictions on the multicast technology used to setup multicast trees across the network. For example, tree setup modules 51, 52 may use RSVP 38, PIM 40, or LDP 42 to establish multicast trees. In some cases, RSVP 38 may be extended to provide TE capabilities.

For example, default tree setup module 51 may use RSVP 38 to instantiate a P2MP LSP as a multicast tree. As described above, auto-discovery module 48 discovers the VPLS memberships of other PE routers in the network. Once the leaves of the multicast default tree are discovered, default tree setup module 51 signals the LSP with conventional RSVP-TE P2MP procedures. Aggregation module 50 may then decide which of the VPLS multicast instances to aggregate into a single multicast default tree. Binding module 49 maps the chosen VPLS multicast instances to the aggregate default tree and uses BGP 39 to advertise the mapping to the egress PE routers, or leaves, of the aggregate default tree.

As another example, default tree setup module 51 may use PIM 40 to setup a multicast tree in the core of the network. In this case, the aggregate default tree is termed an aggregate multicast distribution tree (MDT). Auto-discovery module 48 discovers the VPLS memberships of other PE routers in the network. Aggregation module 50 may then decide which of the VPLS multicast instances to aggregate into a single default multicast tree. Binding module 49 maps the chosen VPLS multicast instances to the aggregate MDT and uses BGP 39 to advertise the mapping to the egress PE routers, or leaves, of the aggregate MDT. The egress PE routers can then join the aggregate MDT. The egress PE routers also join the provider group address corresponding to the aggregate MDT.

In either case, the aggregate default tree may comprise either a source tree or a shared tree. In the case of a shared tree, the aggregate default tree can carry traffic that belonging to locally located VSIs of PE router 30 and remotely located VSIs that exist on other PEs within the network. The other PEs in the network then tunnel the multicast data traffic to the root of the shared tree, e.g., PE router 30, to be transmitted on the shared tree. In this way, the shared tree substantially eliminates the need for each of the PE routers in the network to establish an individual aggregate default tree.

When PE router 30 is coupled to a multicast source, data tree setup module 52 may establish an aggregate data tree across the network. An aggregate default tree, by definition, maps to all the <C-S, C-G> entries belonging to all the VPLS multicast instances associated with the aggregate default tree. An aggregate data tree maps to the specific <C-S, C-G> entries associated with subscriber devices coupled to the aggregate data tree. As one example, aggregate data trees may be used to transport high-bandwidth multicast traffic of one or more specific multicast groups across the network. The specific multicast groups may belong to multiple VPLS multicast instances. Aggregate data trees may substantially eliminate flooding of PE routers that do not have subscriber devices for the specific high-bandwidth multicast traffic.

Prior to setting up aggregate data trees with data tree setup module 52, PE-CE snooping module 58 and PE-PE exchange module 56 learn which PE routers in the network that have subscriber devices of specific multicast groups. PE-CE snooping module 58 learns the <C-S, C-G> entries requested by the local PE router 30. PE-PE exchange module 56 learns the <C-S, C-G> entries requested by remote PE routers in the network. Aggregation module 50 may then decide which of the multicast groups to aggregate into a single multicast data tree. Binding module 49 maps the chosen <C-S, C-G> entries to the aggregate data tree and uses BGP 39 to advertise the mapping to the egress PE routers, or leaves, of the aggregate data tree. In the case where data tree setup module 52 uses PIM 40 to setup an aggregate data tree in the network, the aggregate data tree is termed an aggregate data MDT.

Aggregate data tree creation may be triggered on criteria other than bandwidth once customer join suppression is disabled. For example, there could be a "pseudo wasted bandwidth" criteria such that PE router 30 switches to an aggregate data tree when the bandwidth multiplied by the number of PE routers without subscriber devices for a specific multicast stream is above a specified threshold. This criterion may reduce the amount of bandwidth wasted by sparsely subscribed low-bandwidth groups. In addition, it may substantially eliminate the use of aggregate data trees for a high-bandwidth multicast stream for which all the PE routers in the network have subscriber devices.

For either aggregate default trees or aggregate data trees, once auto-discovery module 48 or PE-PE exchange module 56 has discovered the egress PE routers, i.e., leaves, of the multicast tree within the network, aggregation module 50 determines which VPLS multicast instances or <C-S, C-G> entries to aggregate into a single multicast tree. The heuristics used to decide which VPLS multicast instances or <C-S, C-G> entries to aggregate may be implementation dependent. In some cases, PE router 30 may use offline tools to aide in the aggregation decision.

The "congruency" of aggregation is defined by the amount of overlap in the egress PE routers, or leaves, of the multicast trees that are aggregated. For example, the congruency of aggregate default trees depends on the amount of overlap in memberships of VPLS multicast instances that are mapped to the aggregate default tree. If there is complete overlap, aggregation is substantially perfectly congruent. As the overlap between the VPLS multicast instances that are mapped to the aggregate default tree reduces, the congruency reduces.

If aggregation module 50 performs aggregation that it is not substantially perfectly congruent, a PE router in the network may receive multicast traffic for VPLS multicast instances to which it does not belong. As the amount of multicast traffic for these unwanted VPLS multicast instances increases, aggregation becomes less optimal with respect to delivered traffic. Hence there is a tradeoff between reducing state in the network and delivering unwanted traffic.

Aggregation module 50 may provide control over the congruency of aggregation. For example, user interface 44 may receive aggregation configuration information from a system administrator. In this way, a service provider may deploy aggregation depending on the VPLS membership and traffic profiles in the network. The service provider may also engineer the maximum amount of unwanted VPLS multicast instances for which a particular PE router may receive traffic.

Aggregate default trees and aggregate data trees require a mechanism for the egress PE routers to demultiplex the multicast traffic received over the multicast trees. Since multicast traffic belonging to multiple VPLS multicast instances can be carried over the same multicast tree, there is a need to identify the VPLS to which the multicast packet belongs. An ingress router of the multicast tree may assign an inner label that corresponds to the multicast VSI for which the packet is intended. The ingress router uses this inner label while encapsulating a customer multicast data packet. Each of the egress PE routers of the multicast tree is capable of associating this inner label with the same VPLS and using the inner label to demultiplex the multicast traffic received over the aggregate default tree or the aggregate data tree.

For purposes of illustration, PE router 30 will be described as an egress PE router of the multicast tree. Using a downstream label assignment would require all of the egress PE routers of the VPLS, including PE router 30, to agree on a common label for the VPLS.

Therefore, the ingress PE router uses upstream label assignment to allocate the inner label. PE router 30 comprises a separate label space for every aggregate default tree and every aggregate data tree for which PE router 30 is a leaf node. Control unit 31 creates a forwarding entry within forwarding information 47 for the inner label allocated by the ingress PE.

When PE router 30 receives a packet over an aggregate multicast tree, an aggregate tree identifier (TI) specifies the label space in which to perform the inner label lookup. In some cases, control unit 31 may create a logical interface within multicast tree interfaces 54 that corresponds to the aggregate multicast tree. The logical interface within multicast tree interface 54 then specifies the label space in which to perform the inner label lookup.

The ingress PE router informs the egress PE routers of the aggregate multicast tree about the inner label as part of a discovery procedure. As described above, once a PE router sets up an aggregate default tree or an aggregate data tree, binding module 49 uses BGP 39 to announce the VPLS multicast instances or the <C-S, C-G> entries mapped to the multicast tree to the egress PE routers in the network. For an aggregate default tree, binding module 49 announces the mapping of all VPLS multicast instances mapped to the aggregate default tree. The announcement also includes the inner label allocated by the ingress PE for each VPLS and the aggregate default TI. For an aggregate data tree binding module 49 announces the mapping of all specific <C-S, C-G> entries mapped to the aggregate data tree. The announcement also includes the inner label allocated by the ingress PE for each <C-S, C-G> entry and the aggregate data TI.

Control unit 31 may use IP/GRE (internet protocol/generic routing encapsulation) or MPLS to encapsulate multicast data packets for transmission on aggregate default trees or aggregate data trees. If the aggregate default tree or the aggregate data tree uses MPLS encapsulation, the outer MPLS label and the incoming interface specifies the label space of the inner label. In this case, penultimate-hop-popping is disabled. If the aggregate default tree or the aggregate data tree uses IP/GRE encapsulation, the root PE router source address and the provider group address of the multicast tree specifies the label space of the inner label. A lookup in the label space of the inner label identifies the multicast VSI in which to perform the customer multicast lookup.

The architecture of router 30 illustrated in FIG. 2 is shown for exemplary purposes only. The invention is not limited to this architecture. In other embodiments, router 30 may be configured in a variety of ways. In one embodiment, for example, some of the functionally of control unit 31 may be distributed within IFCs 32. In another embodiment, control unit 31 may include a routing engine that performs routing functions and maintains routing information base (RIB), e.g., routing information 46, and a forwarding engine that performs packet forwarding based on a forwarding information base (FIB), e.g., forwarding information 47, generated in accordance with the RIB.

Control unit 31 may be implemented solely in software, or hardware, or may be implemented as a combination of software, hardware, or firmware. For example, control unit 31 may include one or more processors which execute software instructions. In that case, the various software modules of control unit 31 may comprise executable instructions stored on a computer-readable medium, such as computer memory or hard disk.

Figure 3:
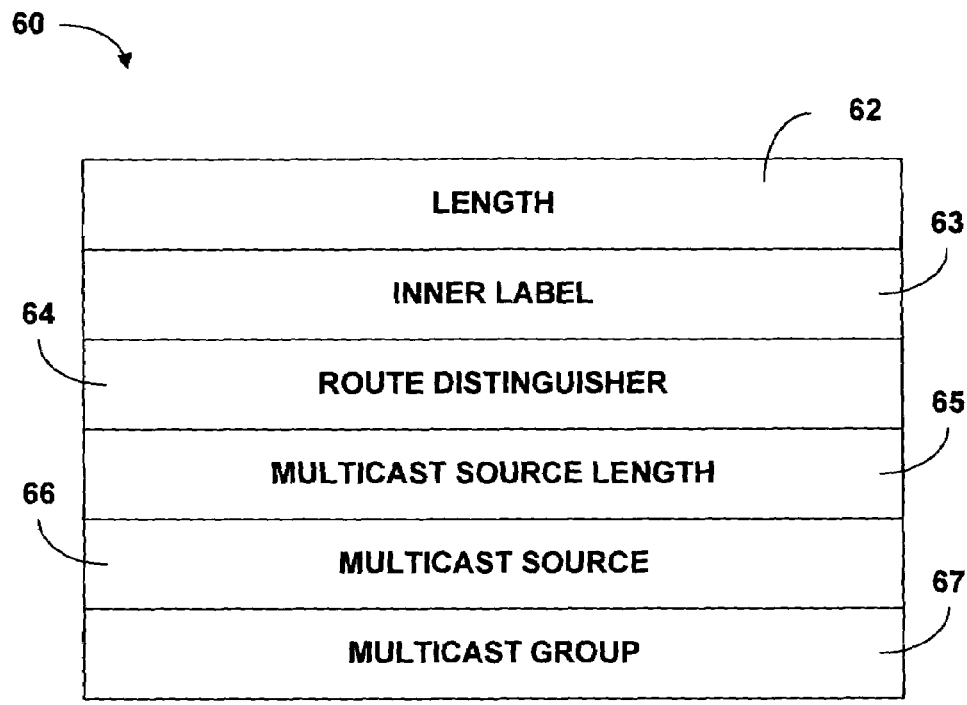
FIG. 3 illustrates an exemplary BGP encoding of network layer reachability information (NLRI).

FIG. 3 illustrates an exemplary BGP encoding 60 of network layer reachability information (NLRI) that may be utilized as an extension to BGP to support embodiments of the invention. In this example, the NLRI is associated with a VPLS subsequent address family identifier (SAFI). BGP encoding 60 comprises at least a portion of a BGP advertisement. As described above, BGP advertisements are used for propagation of customer multicast control information, aggregate default tree discovery, and aggregate data tree discovery.

BGP encoding 60 encodes the NLRI into a length field 62, a MPLS label field 63, a route distinguisher (RD) field 64, a multicast source length field 65, a multicast source field 66, and a multicast group field 67. Length field 62 comprises two octets and RD field 64 comprises eight octets. The remaining fields within BGP encoding 60 comprise variable field lengths.

For propagation of customer multicast control information, the information elements are included in BGP encoding 60. For a particular VPLS, the BGP advertisement includes the RD 64 configured for the VPLS multicast instance. RD 64 uniquely identifies the <C-S, C-G> entry as the PE router addresses could overlap between different VPLS multicast instances. The BGP advertisement also includes the customer multicast source address 66 and the customer multicast group address 67. Multicast addresses 66 and 67 can be prefixes.

When the ingress PE router distributes this information, the BGP advertisement includes a Route Target Extended Communities (RTEC) attribute. The RTEC attribute may be an "import route target" of each VSI in the multicast tree. BGP distribution procedures ensure that the advertised information gets associated with the right VSIs. The address of the PE router that originates the customer control information is carried in the BGP next-hop address of the MP_REACH_ATTRIBUTE.

The root of an aggregate default tree maps one or more VPLS multicast instances to the aggregate default tree. For aggregate default tree discovery, the information elements for the VPLS multicast instances that are mapped to the aggregate default tree are included in BGP encoding 60 of the NLRI. RD field 64 is set to the configured RD for the VPLS and multicast group field 67 are set to zero. For a particular VPLS, the BGP advertisement includes the address of the root of the aggregate default tree and the inner label allocated by the root of the aggregate default tree for the VPLS.

When the ingress PE router distributes this information, the BGP advertisement also includes an aggregate default tree identifier (TI) attribute and a RTEC attribute. The BGP next-hop address in the NEXT_HOP attribute or the MP_REACH_ATTRIBUTE may be set to the provider address of the root of the aggregate default tree.

The root of an aggregate data tree maps one or more <C-S, C-G> entries to the aggregate data tree. For aggregate data tree discovery, the information elements for the <C-S, C-G> entries that are mapped to the aggregate data tree are included in BGP encoding 60 of the NLRI. For a particular <C-S, C-G> entry, the BGP advertisement includes the RD 64 corresponding to the multicast enabled VSI. RD 64 uniquely identifies the <C-S, C-G> entry as the aggregate data tree root address could overlap between different VPLS multicast instances. The BGP advertisement also includes the inner label allocated by the root of the aggregate data tree for the <C-S, C-G> entry. Furthermore, the BGP advertisement includes the customer multicast source address 66 and the customer multicast group address 67. Multicast addresses 66 and 67 can be prefixes in order to allow a range of customer source and group addresses to be mapped to the aggregate data tree.

When the ingress PE router distributes this information, the BGP advertisement includes an aggregate data TI attribute and a RTEC attribute. The address of the Aggregate Data Tree root is carried in the BGP next-hop address of the MP_REACH_ATTRIBUTE.

Figure 4:
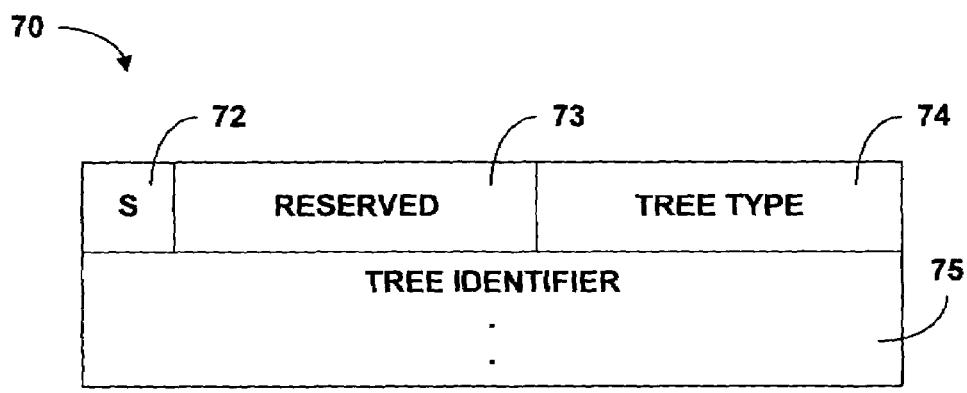
FIG. 4 illustrates an example tree identifier (TI) attribute.

FIG. 4 illustrates an example tree identifier (TI) attribute 70 for use with embodiments of the invention. TI attribute 70 enables identification of a specific aggregate default tree or aggregate data tree. As described above, aggregate default tree and aggregate data tree advertisements carry TI attribute 70. TI attribute 70 includes whether the aggregate multicast tree is a shared aggregate multicast tree and the type of tunneling protocol the root of the aggregate multicast tree used to establish the aggregate multicast tree. The TI attribute also includes the identifier of the aggregate multicast tree based on the tree type.

TI attribute 70 includes an S bit field 72, a reserved field 73, a tree type field 74, and a tree identifier list field 75. S bit 72 is set when the aggregate multicast tree comprises a shared aggregate multicast tree. In other words, TI attribute 70 announces when the aggregate multicast tree is capable of carrying traffic that belongs to VSIs that do not exist on the root of the aggregate multicast tree. Tree type field 74 identifies the multicast tunneling technology used by the root of the aggregate multicast tree to establish the aggregate multicast tree. In this way, tree type field 74 determines the semantics of tree identifier list field 75.

Tree type field 74 may identify one of PIM-SSM (source specific mode) MDT, PIM-SM (sparse mode) MDT, or RSVP-TE P2MP LSP. When the type is set to PIM-SM MDT or PIM-SSM MDT, tree identifier list field 75 contains a PIM provider source-group (<P-S, P-G>) address. Hence MP_REACH identifies a set of VPLS customer multicast trees, the TI attribute identifies a particular aggregate multicast tree, and the BGP advertisement of MP_REACH and TI creates a binding between the aggregate multicast tree and the set of VPLS customer trees.

Figure 5:
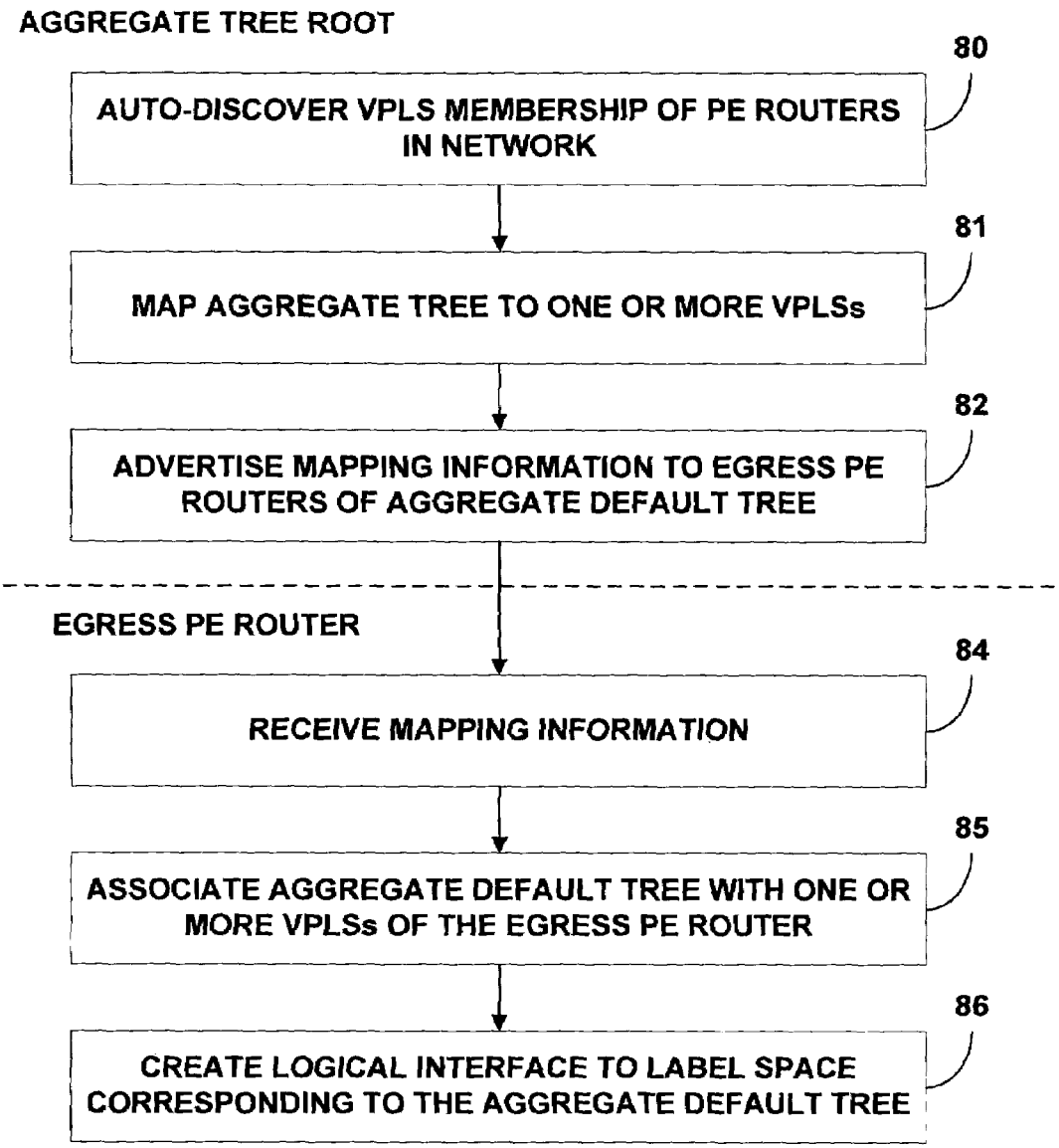
FIG. 5 is a flowchart illustrating an example procedure for setting up an aggregate default tree between a root of the aggregate default tree and an egress PE router.

FIG. 5 is a flowchart illustrating an example procedure for setting up an aggregate default tree between a root of the aggregate default tree and an egress PE router. In the case of an aggregate default tree, the aggregate tree root may comprise a PE router or a RP within the network. The aggregate default tree may be a source tree or a shared tree. The aggregate tree root and the egress PE router may operate substantially similar to PE router 30 illustrated in FIG. 2.

The aggregate tree root uses BGP or another VPLS auto-discovery protocol to discover the VPLS memberships of the PE routers in the network (80). In this way, the aggregate tree root has a complete view of the VPLS memberships of the other PE routers.

From the complete VPLS listing, the aggregate tree root determines which of the VPLS multicast instances to aggregate into a single default multicast tree. The aggregate tree root then maps the aggregate default tree to these VPLS multicast instances (81). The aggregate tree root uses BGP to advertise the mapping information to the egress PE routers of the aggregate default tree (82).

At least one of the egress PE routers of the aggregate default tree receives the advertised mapping information (84). The egress PE router examines the mapping information and associates the aggregate default tree with one or more of the VPLS multicast instances to which the egress PE router belongs (85). The egress PE router then creates a logical interface to a label space corresponding to the aggregate default tree (86). As described herein, a multicast packet transmitted on the aggregate multicast tree includes an inner label that identifies the VPLS to which the packet belongs. The logical interface directs the egress PE router to the appropriate label space in which to perform an inner label lookup. The inner label lookup in turn determines the VSI in which the egress PE router performs a customer multicast packet lookup.

Figure 6:
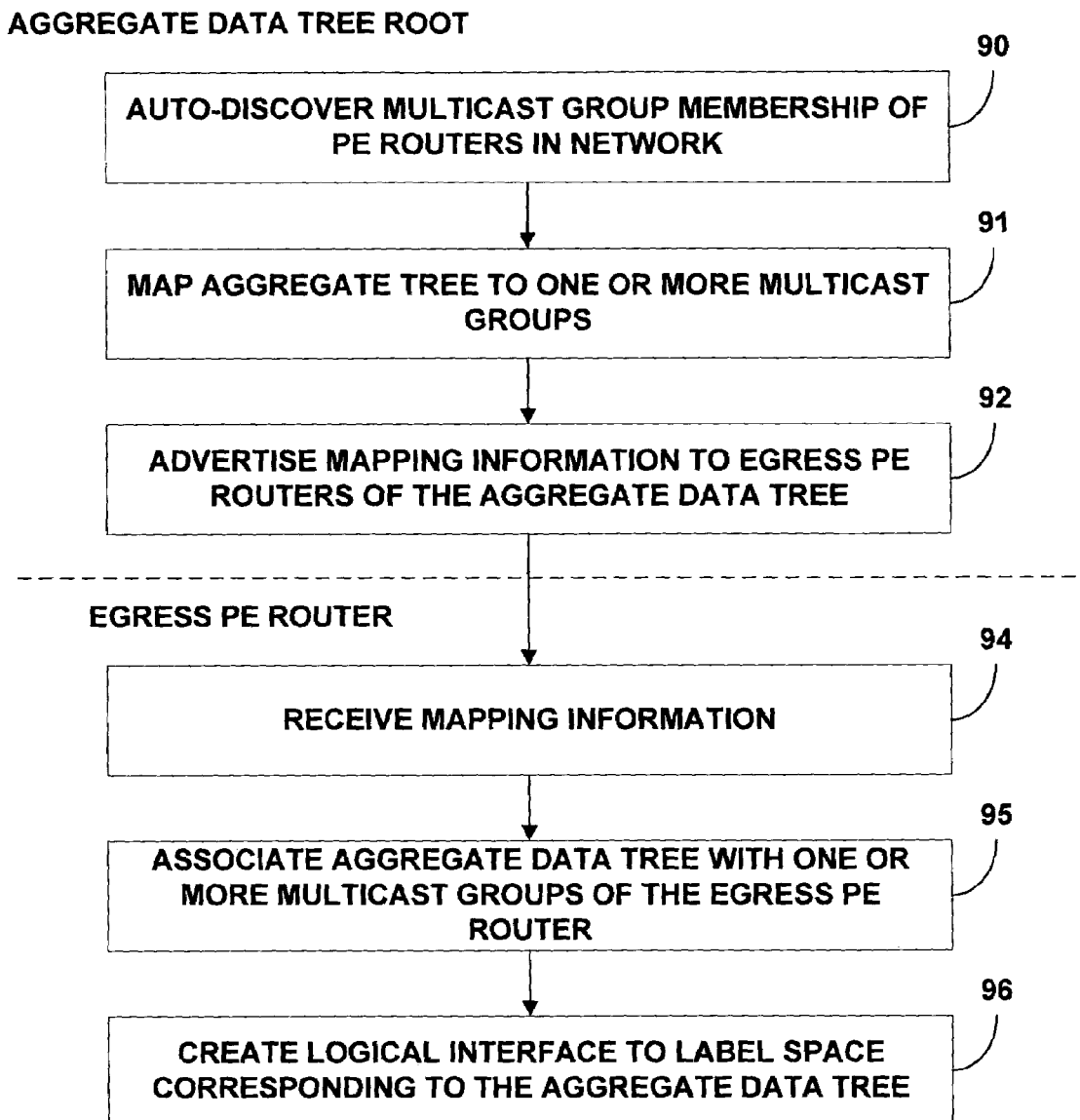
FIG. 6 is a flowchart illustrating an example procedure for setting up an aggregate data tree between a root of the aggregate data tree and an egress PE router.

FIG. 6 is a flowchart illustrating an example procedure for setting up an aggregate data tree between a root of the aggregate data tree and an egress PE router. In the case of an aggregate data tree, the aggregate tree root comprises a PE router coupled to a multicast source. The aggregate data tree may be a source tree or a shared tree. The aggregate tree root and the egress PE router may operate substantially similar to PE router 30 illustrated in FIG. 2.

The aggregate tree root uses customer join messages received on a reliable transport protocol to discover the multicast group memberships, i.e., <C-S, C-G> entries, of the PE routers in the network (90). In this way, the aggregate tree root has a complete view of the <C-S, C-G> entries of the other PE routers. From the complete multicast group listing, the aggregate tree root determines which of the <C-S, C-G> entries to aggregate into a single data multicast tree. The aggregate tree root then maps the aggregate data tree to these specific multicast groups (91). The aggregate tree root uses BGP to advertise the mapping information to the egress PE routers of the aggregate data tree (92).

At least one of the egress PE routers of the aggregate data tree receives the advertised mapping information (94). The egress PE router examines the mapping information and associates the aggregate data tree with one or more of the specific <C-S, C-G> entries to which the egress PE router belongs (95). The egress PE router then creates a logical interface to a label space corresponding to the aggregate data tree (96). As described herein, a multicast packet transmitted on the aggregate multicast tree includes an inner label that identifies the multicast group to which the packet belongs. The logical interface directs the egress PE router to the appropriate label space in which to perform an inner label lookup. The inner label lookup in turn determines the VSI in which the egress PE router performs a customer multicast packet lookup.

Figure 7A:
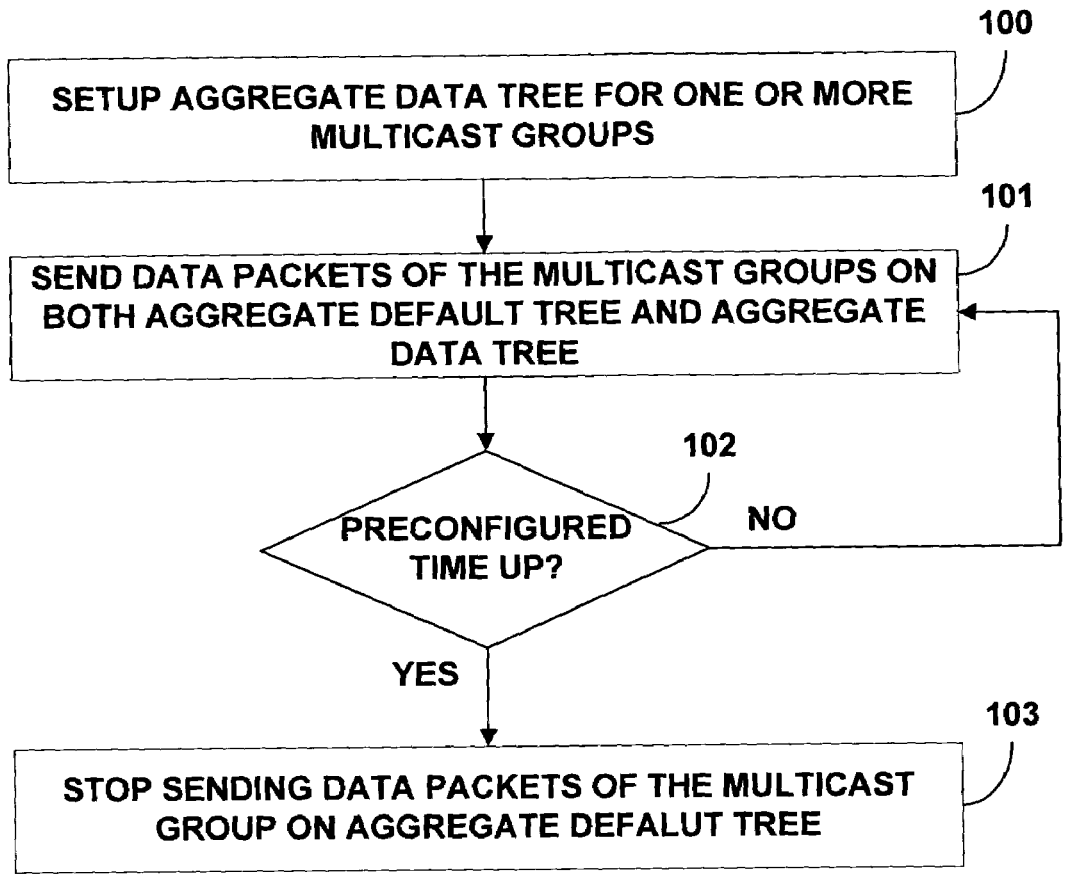
FIGS. 7A and 7B are flowcharts illustrating two exemplary processes of switching from an aggregate default tree to an aggregate data tree.
Figure 7B:
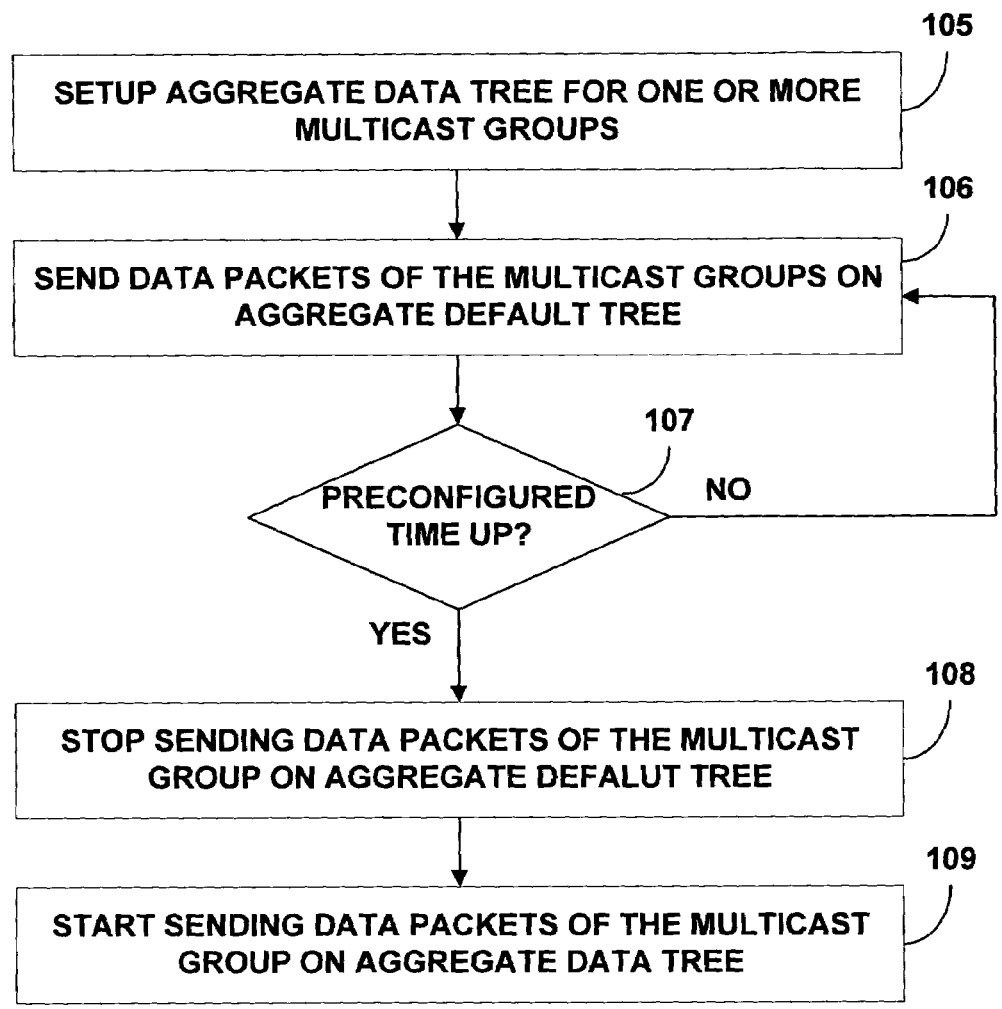

FIGS. 7A and 7B are flowcharts illustrating two exemplary processes of switching from an aggregate default tree to an aggregate data tree. Aggregate data trees provide a PE router with the ability to create separate multicast trees for specific <C-S, C-G> entries. In some cases, aggregate data trees may be setup when an amount of bandwidth on an aggregate default tree is greater than a specified threshold. In other cases, aggregate data trees may be setup when the bandwidth multiplied by the number of PE routers without subscriber devices for a specific multicast traffic is above a specified threshold. The ingress PE router that originates the aggregate data tree and the egress PE routers of the aggregate data tree switch to the aggregate data tree for the <C-S, C-G> entries that are mapped to the aggregate data tree.

FIG. 7A illustrates a first switching process. An ingress PE router sets up an aggregate data tree mapped to one or more multicast groups, i.e., <C-S, C-G> entries (100). The ingress PE router then announces the mapping of the <C-S, C-G> entries to the aggregate data tree to the egress PE routers of the aggregate data tree. Depending on the multicast tunneling technology, the ingress PE router may make the announcement before or after setting up the aggregate data tree. After the egress PE routers of the aggregate data tree receive the announcement, the egress PE routers setup forwarding entries, as described above, to receive multicast traffic on the aggregate data tree.

Once the ingress PE router sets up the aggregate data tree, the ingress PE router sends multicast packets of the specific <C-S, C-G> entries mapped to the aggregate data tree on both the aggregate data tree and the aggregate default tree (101). After a preconfigured amount of time (yes branch of 102), the ingress PE router stops sending the multicast packets of the specific <C-S, C-G> entries on the aggregate default tree (103).

FIG. 7B illustrates a second switching process. An ingress PE router sets up an aggregate data tree mapped to one or more multicast groups, i.e., <C-S, C-G> entries (105). The ingress PE router then announces the mapping of the <C-S, C-G> entries to the aggregate data tree to the egress PE routers of the aggregate data tree. Depending on the multicast tunneling technology, the ingress PE router may make the announcement before or after setting up the aggregate data tree. After the egress PE routers of the aggregate data tree receive the announcement, the egress PE routers setup forwarding entries, as described above, to receive multicast traffic on the aggregate data tree.

Once the ingress PE router sets up the aggregate data tree, the ingress PE router sends multicast packets of the specific <C-S, C-G> entries mapped to the aggregate data tree on the aggregate default tree (106). After a preconfigured amount of time (yes branch of 107), the ingress PE router stops sending the multicast packets of the specific <C-S, C-G> entries on the aggregate default tree (108). The ingress PE router then starts sending the multicast packets of the specific <C-S, C-G> entries mapped to the aggregate data tree on the aggregate data tree (109)

Figure 8:
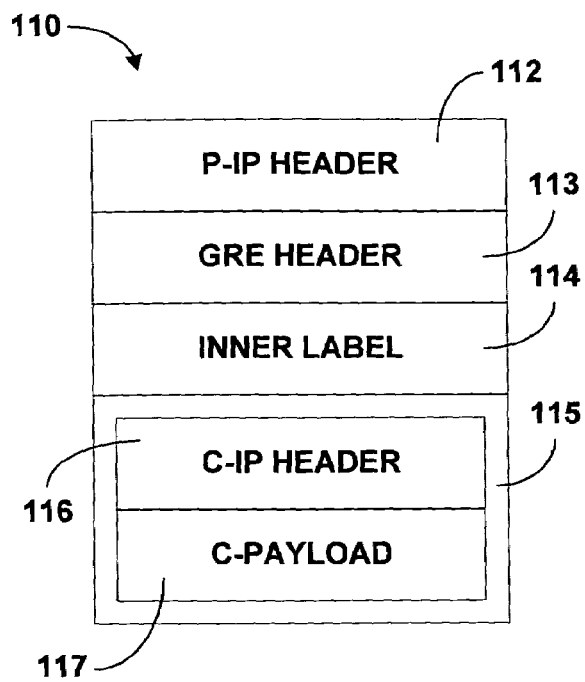
FIG. 8 illustrates an example IP encapsulated packet for transmission on a PIM-based multicast tree.

FIG. 8 illustrates an example IP encapsulated packet 110 for transmission on a PIM-based multicast tree. The example encapsulation of FIG. 8 this may be used for any of the types of multicast trees described herein, including aggregate default multicast trees, aggregate data multicast trees, source multicast trees or shared multicast trees.

In this example, IP encapsulated packet 110 includes a provider IP (P-IP) header 112, a GRE header 113, an inner label 114, and an encapsulated payload 115. In the illustrated embodiments, encapsulated payload 115 includes a customer IP (C-IP) header 116 and a customer payload (C-payload) 117. C-payload 117 may comprise a L2 multicast data packet, such as an Ethernet packet, requested by a subscriber device within a VPLS site.

P-IP header 112 contains the aggregate MDT or aggregate data MDT provider group address as the destination address and the root address of the MDT as the source address. The egress PE router of the MDT that receives IP encapsulated packet 110 performs a lookup on P-IP header 112 and determines the forwarding entry or interface created within the egress PE router corresponding to the aggregate MDT or aggregate data MDT. The forwarding entry or interface specifies the label space in which to perform a lookup of inner label 114.

Inner label 114 is unique within the context of the root of the MDT as it is assigned by the root of the MDT without coordination with other PE routers in the network. Therefore, inner label 114 is not unique across multiple PE routers. In order to unambiguously identify a particular VPLS or multicast group, the egress PE router has to know inner label 114 and the context within which inner label 114 is unique. The context is provided by P-IP header 112.

The egress PE router strips P-IP header 112 and GRE header 113. The egress PE router than performs the lookup of inner label 114 to determine the VSI in which the egress PE router needs to perform the customer multicast data packet lookup. The egress PE router strips inner label 114 and sends the L2 multicast packet to the VSI for multicast data forwarding.

Figure 9:
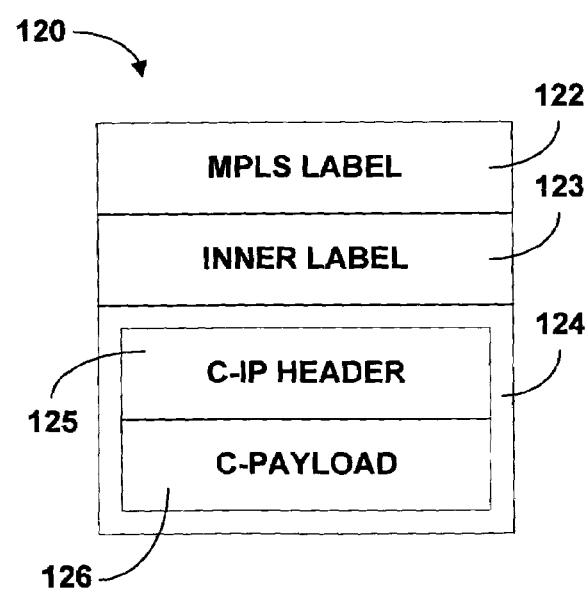
FIG. 9 illustrates an example MPLS encapsulated packet for transmission on a RSVP- or LDP-based multicast tree.

FIG. 9 illustrates an example MPLS encapsulated packet 120 for transmission on a RSVP- or LDP-based multicast tree. The example encapsulation of FIG. 9 this may be used for any of the types of multicast trees described herein, including aggregate default multicast trees, aggregate data multicast trees, source multicast trees or shared multicast trees.

In this example, MPLS encapsulated packet 120 includes an MPLS label 122, an inner label 123, and an encapsulated payload 124. In the illustrated embodiments, encapsulated payload 124 includes a customer IP (C-IP) header 125 and a customer payload (C-payload) 126. C-payload 126 may comprise a L2 multicast data packet, such as an Ethernet packet, requested by a subscriber device within a VPLS site.

The egress PE router of an aggregate default tree or an aggregate data tree that receives MPLS encapsulated packet 120 performs a lookup on MPLS label 122 and determines the forwarding entry or interface created within the egress PE router corresponding to the aggregate default tree or aggregate data tree. The forwarding entry or interface specifies the label space in which to perform a lookup of inner label 123.

Inner label 114 is unique within the context of the root of the aggregate tree as it is assigned by the root of the aggregate tree without coordination with other PE routers in the network. Therefore, inner label 114 is not unique across multiple PE routers. In order to unambiguously identify a particular VPLS or multicast group, the egress PE router has to know inner label 123 and the context within which inner label 123 is unique. The context is provided by MPLS label 122.

The egress PE router strips MPLS label 122 and performs the lookup of inner label 123 to determine the VSI in which the egress PE router needs to perform the customer multicast data packet lookup. The egress PE router then strips inner label 123 and sends the L2 multicast packet to the VSI for multicast data forwarding.

Figure 10:
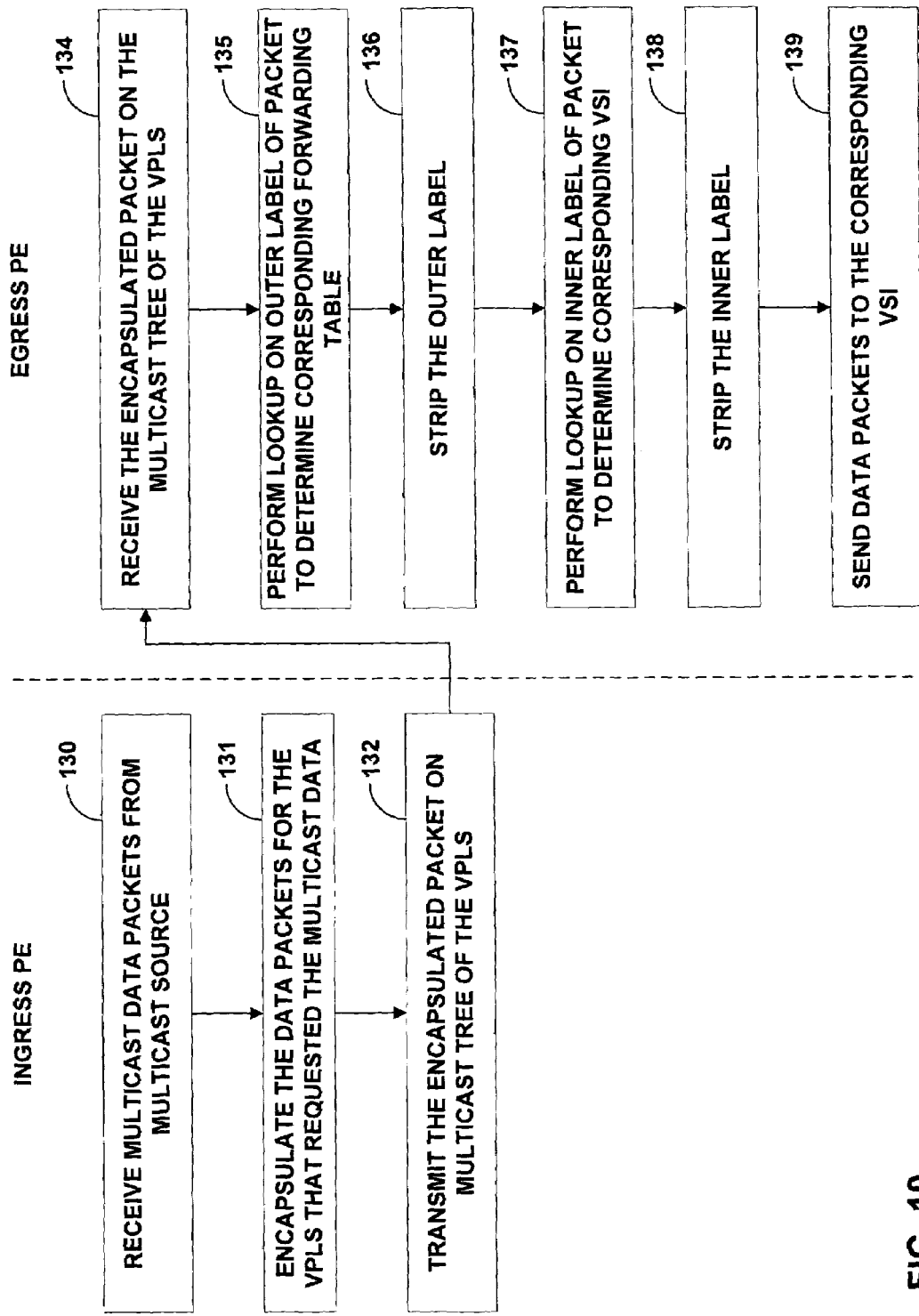
FIG. 10 is a flowchart illustrating an example process of forwarding multicast data packets on an aggregate multicast tree across a public network.

FIG. 10 is a flowchart illustrating an example process of forwarding multicast data packets on an aggregate multicast tree across a public network. The process will be described herein in reference to SP network 10 of FIG. 1. For purposes of illustration, multicast tree 15 comprises an aggregate default tree. PE router 12A establishes multicast tree 15 as a RSVP-TE P2MP LSP across SP network 10 between ingress PE router 12A and egress PE routers 12B and 12C. PE router 12A maps VPLS A and VPLS B to multicast tree 15. Multicast tree 15 may be a source tree or a shared tree.

PE router 12A receives L2 multicast data packets, such as Ethernet packets, for at least one of VPLS A and VPLS B from multicast source 24 (130). PE router 12A encapsulates the multicast data packets for the one of VPLS A and VPLS B that includes subscriber devices of the multicast traffic (131). PE router 12A then transmits the encapsulated packet on multicast tree 15, which is mapped to the VPLS (132).

Egress PE router 12C, for example, receives the encapsulated packet on multicast tree 15 (134). Egress PE router 12C performs a lookup on the outer label of the encapsulated packet to determine the forwarding entry within egress PE router 12C that corresponds to multicast tree 15 (135). Egress PE router 12C then strips the outer label (136).

Egress PE router 12C performs a lookup on the inner label of the encapsulated packet to determine the VSI the corresponds to the VPLS (137). Egress PE router 12C then strips the inner label (138) and sends the multicast data packets to the corresponding VSI for forwarding to subscriber devices of the multicast traffic within the VPLS site.

Various embodiments of the invention have been described. These and other embodiments are within the scope of the following claims.

The invention claimed is:
1. A method comprising:
using a label distribution protocol, establishing a point-to-multipoint (P2MP) label switched path (LSP) forming a multicast tree for transporting layer two (L2) multicast data packets for one or more virtual private local area network service (VPLS) multicast instances, wherein the multicast tree includes a source device providing an ingress to the P2MP LSP and a plurality of destination devices providing egresses from the P2MP LSP, wherein each of the plurality of destination devices is coupled to one or more respective customer networks having local VPLS sites and belongs to at least one VPLS multicast instance;

after establishing the P2MP LSP, receiving with one or more of the destination devices multicast group join or prune messages from at least one of the customer networks and destined for the source device of the P2MP LSP;

converting the multicast group join or prune messages into routing protocol advertisements by generating the routing protocol advertisements in accordance with a routing protocol different from the label distribution protocol and encoding the join or prune messages within the routing protocol advertisements as control information for the VPLS multicast instances, wherein encoding the multicast group join or prune messages comprises encoding in each of the routing protocol advertisements a route distinguisher that corresponds to the VPLS multicast instance to which each multicast group specified in the multicast group join or prune message belongs, an address of a multicast source associated with each of the multicast groups, and an address of each of the multicast groups; and transmitting the encoded routing protocol advertisements via the routing protocol to communicate the join or prune messages from the destination devices to the source device of the P2MP LSP.

2. The method of claim 1, wherein the routing protocol comprises the border gateway protocol (BGP).

3. The method of claim 1, further comprising encoding in each of the routing protocol advertisements a route target attribute of each of the VPLS multicast instances mapped to the multicast tree.

4. The method of claim 1, further comprising:
establishing tunnels between the source device and the one or more destination devices; and
using the routing protocol to transmit the control information on the tunnels.

5. The method of claim 1, wherein transmitting the encoded routing protocol advertisements comprises transmitting the encoded routing protocol advertisements between remotely located virtual switch interfaces (VSIs) that exist on the destination devices and the source device, wherein the remotely located VSIs correspond to the VPLS multicast instances.

6. The method of claim 1, wherein receiving the multicast group join or prune messages comprises snooping, with the destination devices, multicast communications received from the customer networks and destined for the source device of the P2MP LSP without snooping multicast communications between the destination devices and the source device.

7. The method of claim 6, wherein the snooping mechanism comprises a protocol independent multicast (PIM) snooping mechanism.

8. The method of claim 6, wherein the snooping mechanism comprises an internet group management protocol (IGMP) snooping mechanism.

9. A network device comprising:
one or more network interfaces;
a control unit coupled to the network interfaces;
a label distribution protocol executing on the control unit that establishes a point-to-multipoint (P2MP) label switched path (LSP) forming a multicast tree for transporting layer two (L2) multicast data packets for one or more virtual private local area network service (VPLS) multicast instances, wherein the P2MP LSP includes a source device providing an ingress to the multicast tree and a plurality of destination devices providing egresses from the P2MP LSP, wherein each of the destination devices is coupled to one or more respective customer networks having local VPLS sites and belongs to at least one VPLS multicast instance;

a snooping module that snoops multicast control messages between at least one of the destination devices and network devices of the customer networks; and a device-device exchange module within the control unit that converts the multicast control messages into routing protocol advertisements that encode the multicast control messages, wherein the device-device exchange module encodes each of the routing protocol advertisements with a route distinguisher that corresponds to the VPLS multicast instance to which each multicast group specified in the multicast group join or prune message belongs, an address of a multicast source associated with each of the multicast groups, and an address of each of the multicast groups, and wherein the device-device exchange module transmits the encoded routing protocol advertisements from the destination devices to the source device via the routing protocol to communicate the multicast control messages to the source device of the multicast tree.

10. The network device of claim 9, wherein the routing protocol comprises the border gateway protocol (BGP).

11. The network device of claim 9, wherein the device-device exchange module establishes tunnels between the source device and the one or more destination devices, and uses the routing protocol to transmit the control information on the tunnels.

12. The network device of claim 9, wherein the device-device exchange module transmits the encoded routing protocol advertisements between remotely located virtual switch interfaces (VSIs) that correspond to the VPLS multicast instances.

13. The network device of claim 9, further comprising a device-customer snooping module that snoops multicast communications received from the customer networks and destined for the source device of the P2MP LSP without snooping multicast communications between the destination devices and the source.

14. The network device of claim 13, wherein the device-customer snooping module discovers control information from locally located virtual switch interfaces (VSIs) of the source device that correspond to the VPLS multicast instances.

15. The network device of claim 13, wherein the snooping mechanism comprises one of a protocol independent multicast (PIM) snooping mechanism or an internet group management protocol (IGMP) snooping mechanism.

16. A computer-readable storage medium comprising program code that cause a programmable processor to:
use a label distribution protocol to establish a multicast tree for transporting layer two (L2) multicast data packets for one or more virtual private local area network service (VPLS) multicast instances, wherein the multicast tree includes a source device providing an ingress to the P2MP LSP and a plurality of destination devices providing egresses from the P2MP LSP, wherein each of the plurality of destination devices is coupled to one or more respective customer networks having local VPLS sites and belongs to at least one VPLS multicast instance;

after establishing the P2MP LSP, receiving with one or more of the destination devices multicast group join or prune messages from at least one of the customer networks and destined for the source device of the P2MP LSP;

converting the multicast group join or prune messages into routing protocol advertisements by generating the routing protocol advertisements in accordance with a routing protocol different from the label distribution protocol and encoding the join or prune messages within the routing protocol advertisements as control information for the VPLS multicast instances, wherein encoding the multicast group join or prune messages comprises encoding in each of the routing protocol advertisements a route distinguisher that corresponds to the VPLS multicast instance to which each multicast group specified in the multicast group join or prune message belongs, an address of a multicast source associated with each of the multicast groups, and an address of each of the multicast groups; and transmitting the encoded routing protocol advertisements via the routing protocol to communicate the join or prune messages from the destination devices to the source device of the P2MP LSP.

17. The computer-readable storage medium of claim 16, further comprising program code that causes the programmable processor to:

establish tunnels between the source device and the one or more destination devices; and use the routing protocol to transmit the control information on the tunnels.

18. A system comprising:

a source device within a network;

a plurality of destination devices within the network, wherein each of the destination devices is coupled to one or more respective customer networks having local VPLS sites and belongs to at least one virtual private local area network service (VPLS) multicast instance, and wherein the destination devices receive multicast control messages in the form of join or prune messages from the customer networks;

a point-to-multipoint label switched path (LSP) forming a multicast tree within the network from the source device to the one or more destination devices, wherein the source device provides an ingress to the P2MP LSP and each of the destination devices provide a different egress to the P2MP LSP; and wherein the source device and the one or more destination devices exchange routing protocol advertisements that encode the join or prune messages as control information for the VLPS multicast instances, each of the encoded routing protocol advertisements comprising a route distinguisher that corresponds to the VPLS multicast instance to which each multicast group specified in the multicast group join or prune message belongs, an address of a multicast source associated with each of the multicast groups, and an address of each of the multicast groups, and wherein the source device maintains a database for the multicast tree, the database having entries that indicate the VPLS multicast instances to which each of the destination devices belongs based on the join or prune messages received via the routing protocol advertisements.

19. A method comprising:

using a label distribution protocol, establishing a point-to-multipoint (P2MP) label switched path (LSP) forming a multicast tree for transporting layer two (L2) multicast data packets for one or more virtual private local area network service (VPLS) multicast instances, wherein the multicast tree includes a source device providing an ingress to the P2MP LSP and a plurality of destination devices providing egresses from the P2MP LSP, wherein each of the plurality of destination devices is coupled to one or more respective customer networks having local VPLS sites and belongs to at least one VPLS multicast instance, and wherein establishing the P2MP LSP comprises allocating an outer label for the P2MP LSP with the label distribution protocol, allocating, with the source device, an inner label for each multicast customer source-group mapped to the multicast tree, and communicating the allocated inner labels from the source device to the destination devices to allow the destination devices to demultiplex the multicast data packets received over the P2MP LSP for the different multicast source-groups; and after establishing the P2MP LSP, receiving with one or more of the destination devices multicast group join or prune messages from at least one of the customer networks and destined for the source device of the P2MP LSP;

converting the multicast group join or prune messages into routing protocol advertisements by generating the routing protocol advertisements in accordance with a routing protocol different from the label distribution protocol and encoding the join or prune messages within the routing protocol advertisements as control information for the VPLS multicast instances; and transmitting the encoded routing protocol advertisements via the routing protocol to communicate the join or prune messages from the destination devices to the source device of the P2MP LSP.

20. The method of claim 19, wherein encoding the join or prune messages within the routing protocol advertisements comprises including in the routing protocol advertisement the corresponding inner label allocated by the source of the P2MP LSP for the multicast source-group that is specified by the multicast group join or prune messages.

* * * * *

UNITED STATES PATENT AND TRADEMARK OFFICE
CERTIFICATE OF CORRECTION

PATENT NO.        : 7,590,115 B1
APPLICATION NO. : 11/213639
DATED             : September 15, 2009
INVENTOR(S)       : Aggarwal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 777 days.

Signed and Sealed this

Twenty-first Day of September, 2010

David J. Kappos
*Director of the United States Patent and Trademark Office*